(12) United States Patent
Aoki

(10) Patent No.: US 6,819,818 B2
(45) Date of Patent: Nov. 16, 2004

(54) OPTICAL SWITCHES HAVING A COMMON WAVEGUIDE FOR IMPROVED SWITCH PERFORMANCE

(75) Inventor: Shigenori Aoki, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 63 days.

(21) Appl. No.: 10/330,446

(22) Filed: Dec. 26, 2002

(65) Prior Publication Data

US 2004/0126056 A1 Jul. 1, 2004

(51) Int. Cl.[7] ................................................. G02B 6/35
(52) U.S. Cl. ........................... 385/16; 385/17; 385/18
(58) Field of Search ..................................... 385/16–22

(56) References Cited

U.S. PATENT DOCUMENTS

| 5,103,494 | A | 4/1992 | Mozer |
| 5,572,540 | A | 11/1996 | Cheng |
| 5,581,643 | A | 12/1996 | Wu |
| 5,732,177 | A | 3/1998 | Deacon et al. |
| 5,835,646 | A | 11/1998 | Yoshimura et al. |
| 5,854,868 | A | 12/1998 | Yoshimura et al. |
| 5,963,683 | A | * 10/1999 | Goorjian ..................... 385/16 |
| 6,269,201 | B1 | 7/2001 | Ko et al. |
| 6,611,635 | B1 | 8/2003 | Yoshimura et al. |
| 2001/0016096 | A1 | * 8/2001 | Feldman et al . .............. 385/17 |

FOREIGN PATENT DOCUMENTS

EP     0 689 067 A2     12/1995

\* cited by examiner

*Primary Examiner*—John D. Lee
*Assistant Examiner*—Eric Wong
(74) *Attorney, Agent, or Firm*—Sheppard Mullin Richter & Hampton LLP

(57) ABSTRACT

An optical switch having a common waveguide and optical properties to improve switch performance is presented. The common waveguide is located between a first plural light deflection elements and a second plural light deflection elements, each including prisms made by electro-optic material. The common waveguide material is selected to improve switch performance by increasing the deflection of the light deflecting elements and/or reducing the effects induced by birefringence from the electro-optical material. The present invention can be used in optical switch designs having common waveguides or other optical switches.

19 Claims, 6 Drawing Sheets

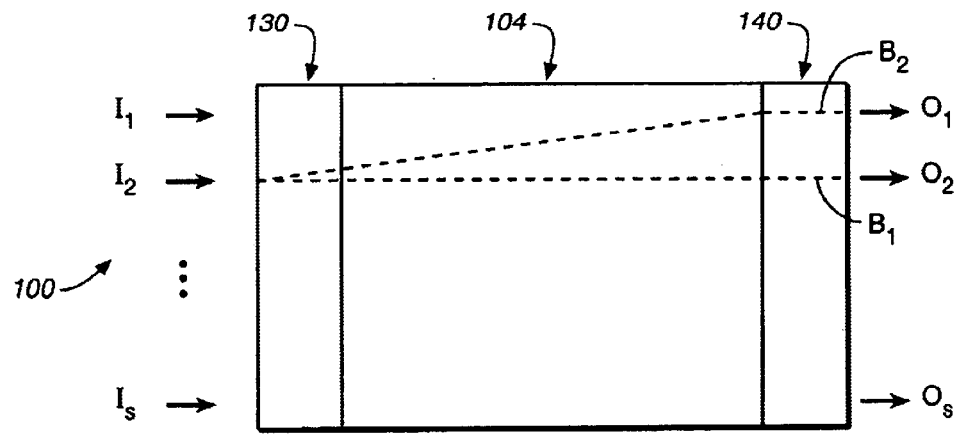
FIG._1
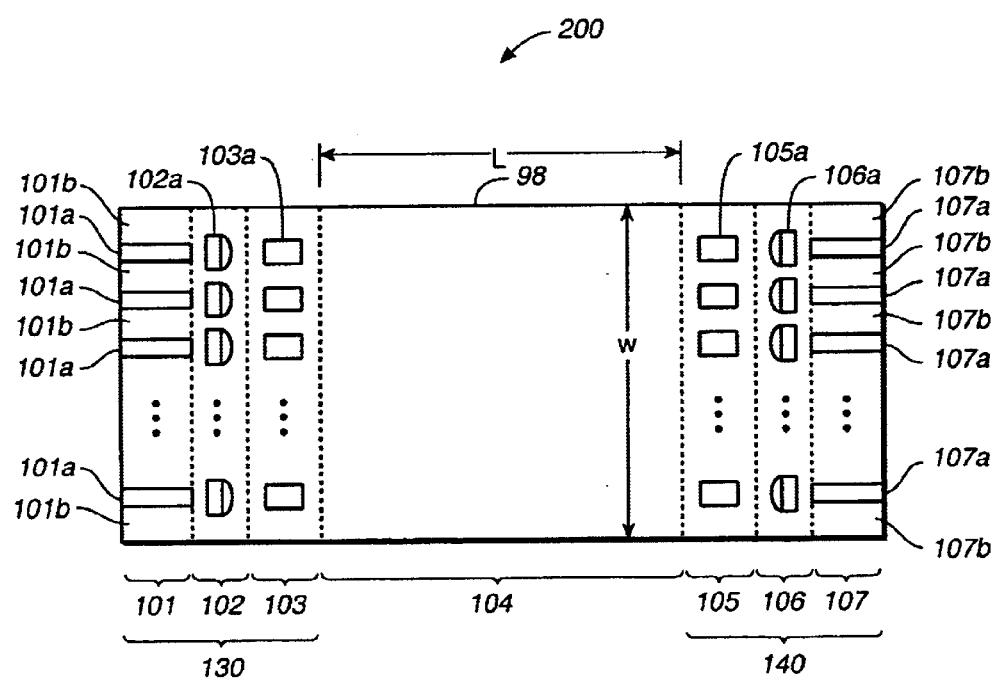
FIG._2

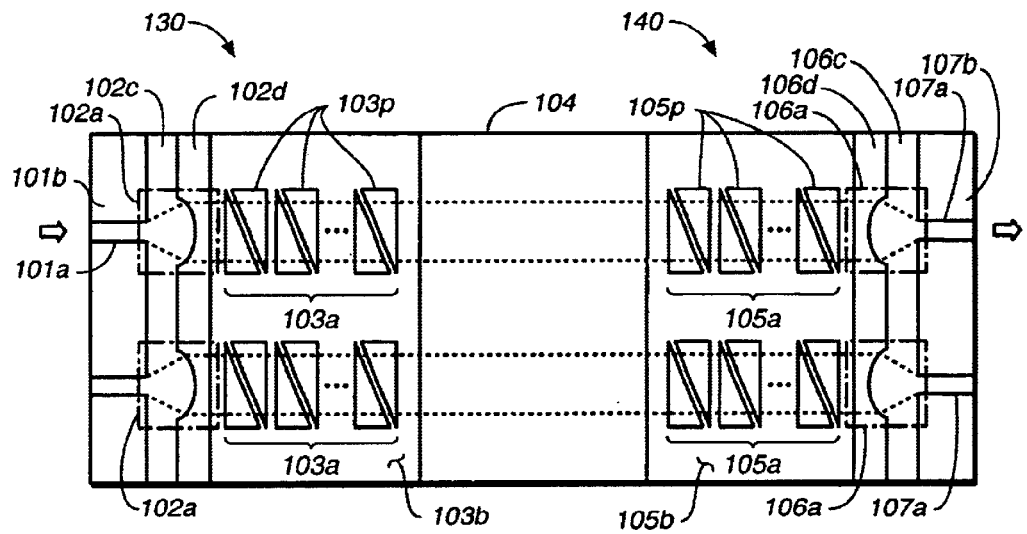
FIG._3
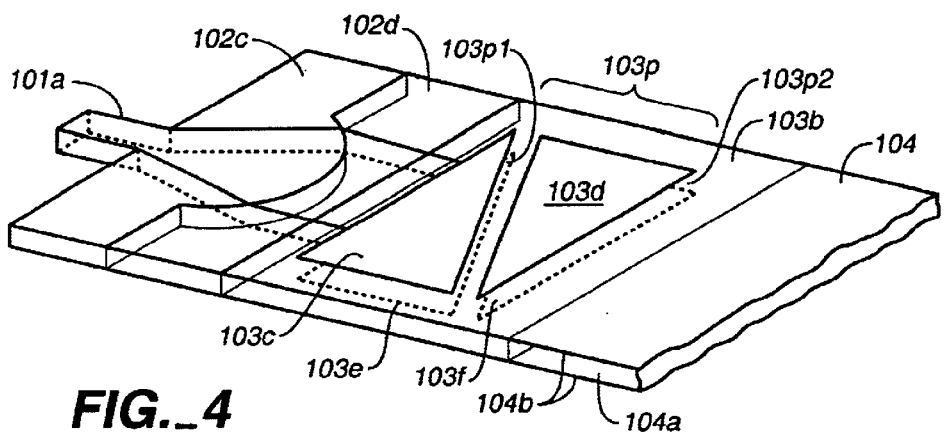
FIG._4
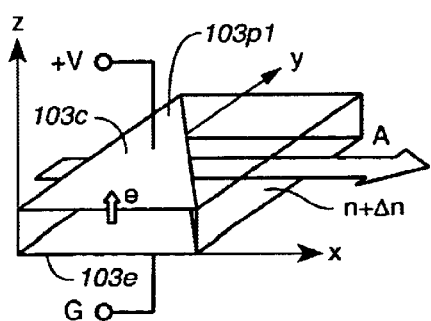
FIG._5A
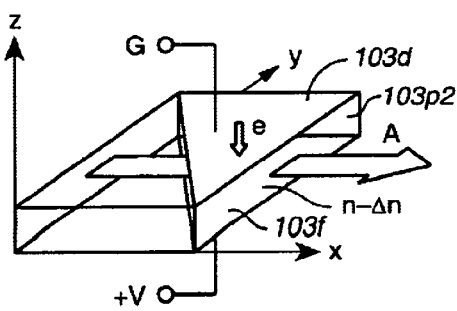
FIG._5B

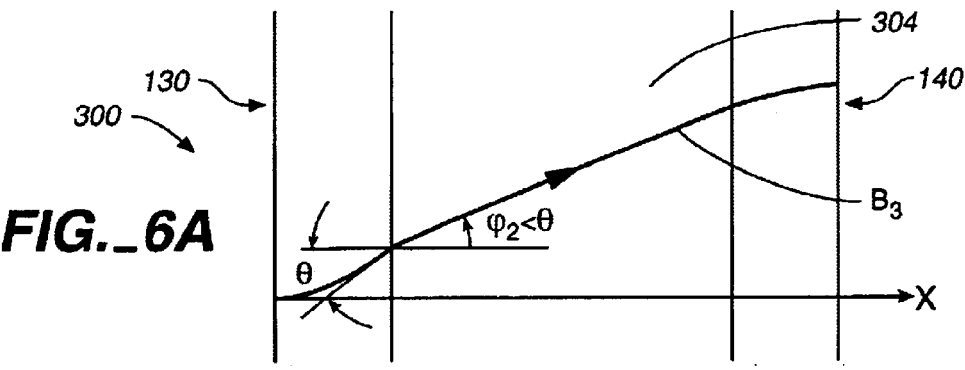
FIG._6A
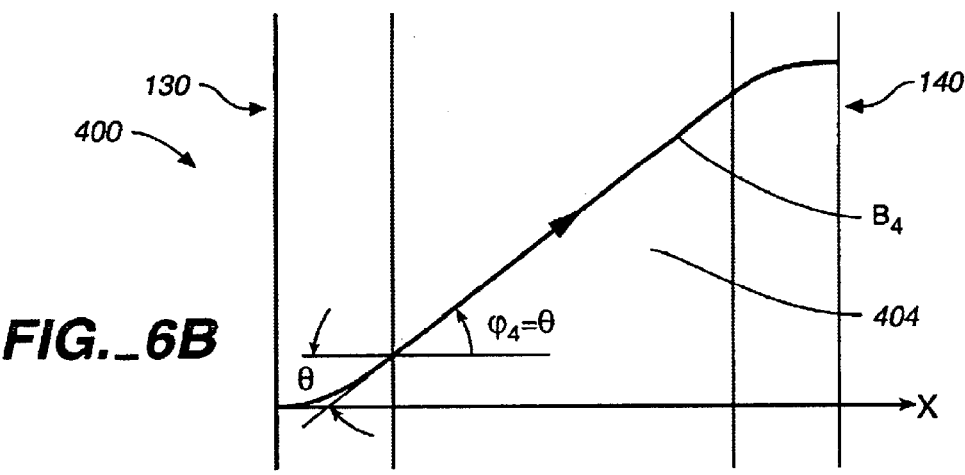
FIG._6B
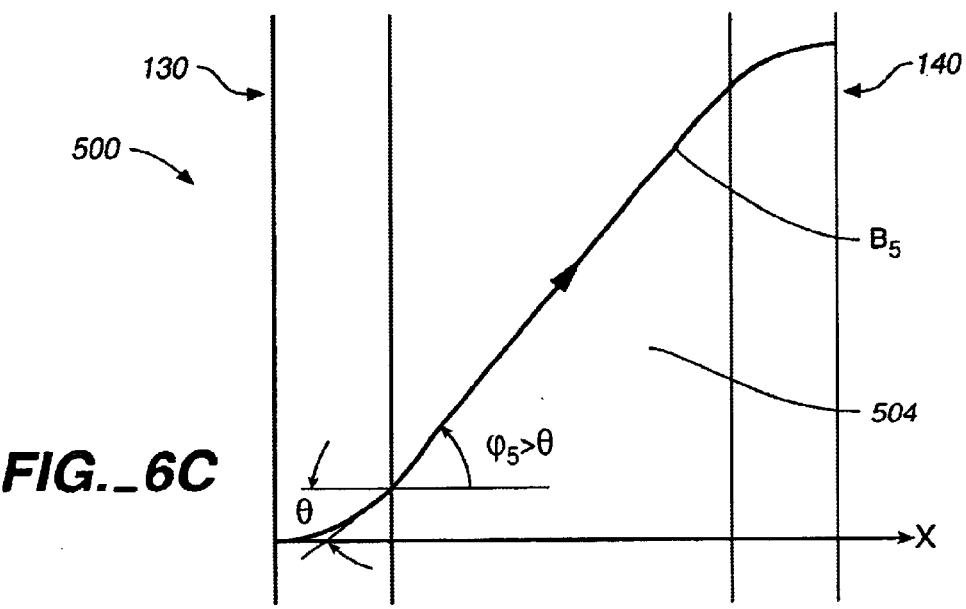
FIG._6C

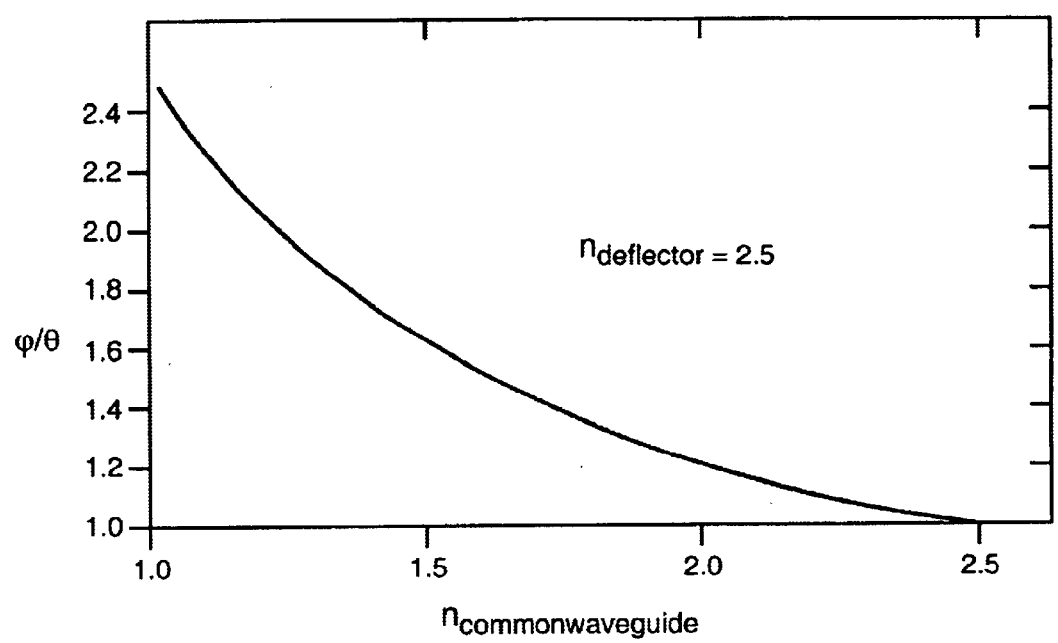
FIG._7

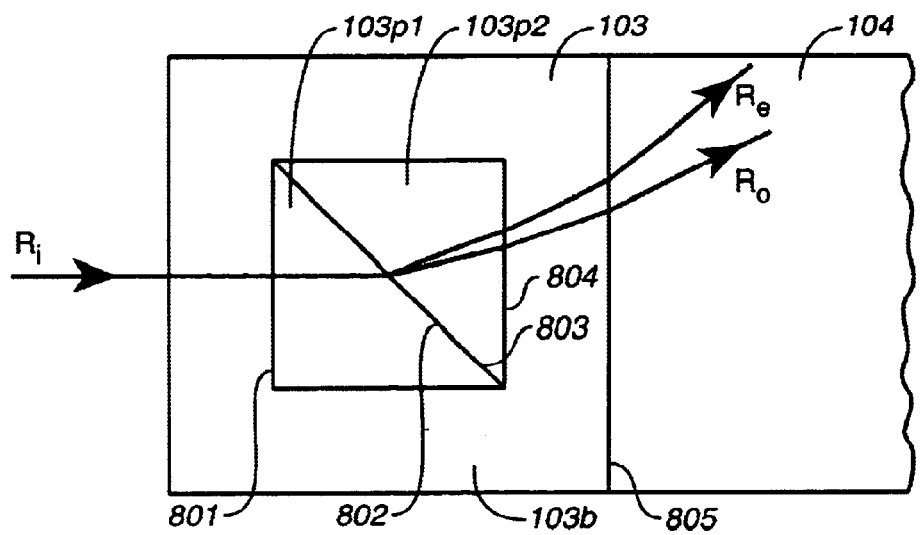
FIG._8A
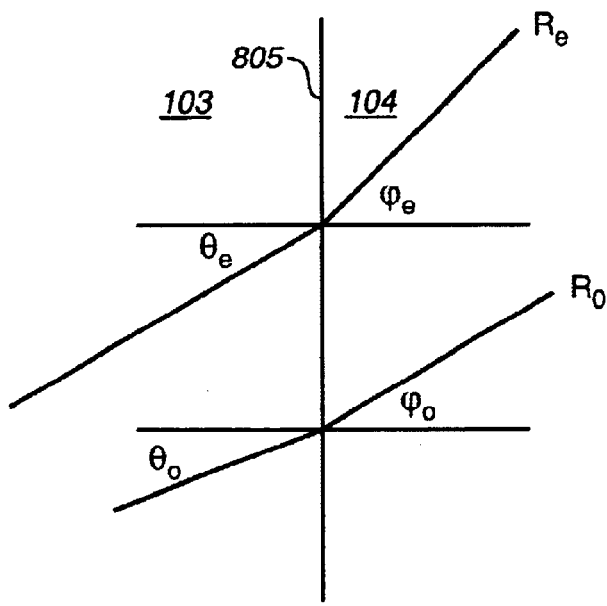
FIG._8B

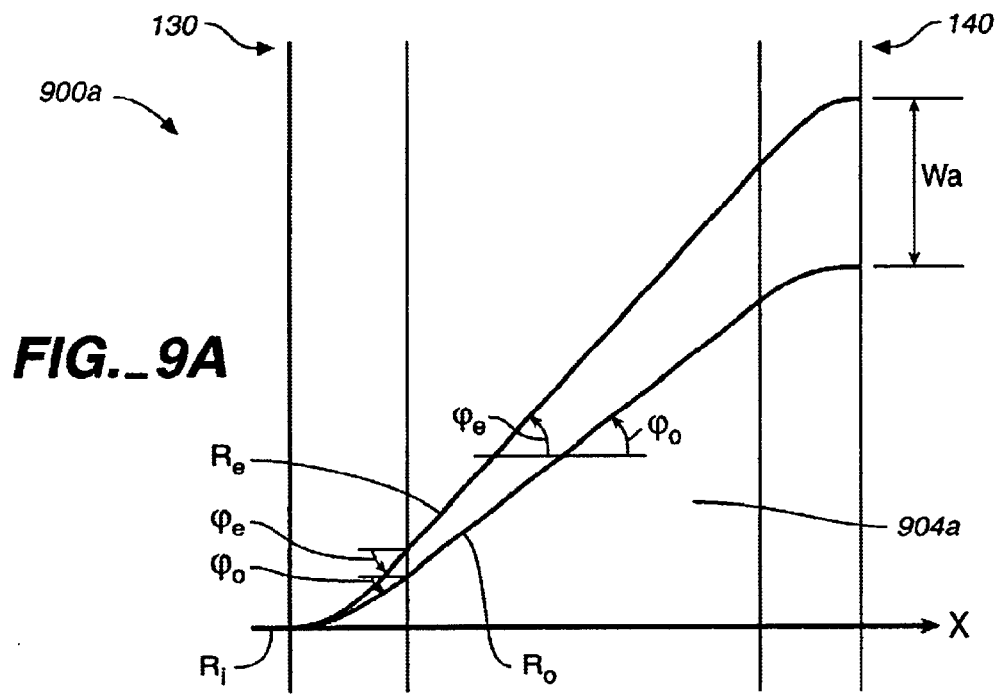
FIG._9A
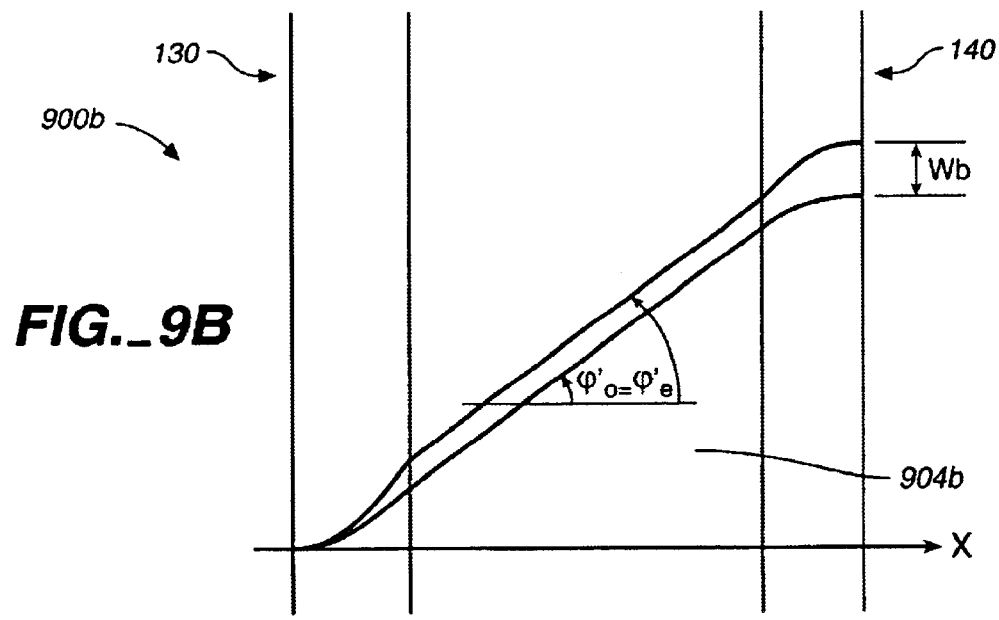
FIG._9B

OPTICAL SWITCHES HAVING A COMMON WAVEGUIDE FOR IMPROVED SWITCH PERFORMANCE

FIELD OF THE INVENTION

This invention is related to an optical switching apparatus for use in optical networks for voice and data communications. In particular, the present invention is directed to an optical switching device having a common waveguide with improved light transmission between an input and an output side.

BACKGROUND OF THE INVENTION

The growth of optical networks for voice and data communication has created a demand for high data-rate information-transfer capabilities. To enable such transfer capabilities, dense wavelength division multiplexing (DWDM) technology has been developed which allows transfer of multiple wavelength light beams over a single optical fiber enabling data transfer rates up to 40–100 Gb/s. High speed switching and routing devices comprise the core elements of the optical networks and allow dynamic control of the data traveling over the optical network. High data transmission rates impose significant demands on the functionality of the switching devices.

Optical cross-connect space division switches based on electro-optic (EO) deflection of the light beam have great potential for use in high speed optical networks. The basic requirements for such devices are the need for extremely fast switching time and the capability to handle a large number of input and output channels, e.g., up to 4000×4000 by the year 2003. Reliability and cost are also important design factors for optical switching devices. Existing optical switching devices which employ signal conversion from optical into electrical and back into optical do not satisfy the anticipated requirements for such devices.

Switching matrixes having very low switching times can be designed to connect a very large number of input and output (I/O) ports. Such switches may be built from an assembly of simple digital optical switches where each can redirect one input signal into two possible output ports. However, optical cross-connect switching elements are more useful for large-scale implementations. These devices require large-scale monolithic switch arrays to perform switching functions. Although the principles used in optical cross-connect switching based on light beam deflection is well known, a robust, reliable, low cost and extendable integration process for such type of switching device is not available.

Currently, the main optical switching products on the market are based on MEMS technology, which employs rotating micro-mirrors to deflect light. However, these optical switching devices are not very reliable due to the large number of moving parts, and the limitation on the switching time caused by the mechanics of the mirrors.

There are several other optical switching technologies which have been proposed but which are still not well represented in the market due to various technological and economic difficulties. Such optical switching technologies include by way of example: the bubble switch, switches based on liquid crystals, and thermo-optic and electro-optic effects, etc. Most of these devices are still in the R&D stage. Some of these technologies, including EO switches, may be applicable for high speed, low cost, high reliability, and high I/O port count products.

Existing EO switch designs, however, require at least two paths from the switch, and a channel waveguide for each path in order to transmit a light input without divergence. Such channel waveguides require a relatively large amount of space in the switching device. As more channels are incorporated into the optical switching device, much more space for the channel waveguides is required.

Recently developed EO switch designs, described for example in the commonly assigned U.S. patent application Ser. No. 09/932,526, filed Aug. 17, 2001 allow for a plurality of EO switches to selectively direct light entering through a plurality of input ports to a plurality of output ports through a common waveguide. Since commonly used EO materials are also birefringent, the light leaving a switch may be deflected as a pair of diverging light beams. If the beams propagate across the waveguide with a divergence that is too large, only a fraction of the information from the input light may reach the output port, or the information may be received at more than one output port. To prevent birefringence from interfering with the operation of these switches, polarizing filters are sometimes incorporated into the switch.

These recently developed EO switch designs have input and output ports that are spaced along either side of the length of the common waveguide. Switching of optical signals between ports is performed by the appropriate amount of beam deflection across a common waveguide as determined by the waveguide materials. There is a need for an improved optical switch device that does not require as much space therein, such as by shortening the length of the common wave guide. There is a further need for an improved optical switch device that corrects or reduces the effect of birefringence of light transmitted from other portions of the device.

SUMMARY OF THE INVENTION

The present invention provides a common waveguide for an optical switch device with improved performance relative to known optical switching devices. In one embodiment of the present invention, the common waveguide increases the deflection of light beams across the optical switch device, allowing for more compact deflection portions or waveguides. In another embodiment of the present invention, the common waveguide corrects for birefringence in other portions of the optical switch device, allowing for greater light transmission efficiency across the device.

The present invention also provides an optical switch device having a common waveguide that improves the performance of prior optical switching devices. In one embodiment of the present invention, the optical switch device includes a common waveguide that increases the deflection of light beams across the optical switch device, allowing for more compact deflection portions or waveguides. In another embodiment of the present invention, the optical switch device includes a common waveguide that reduces the effect of birefringence in other portions of the optical switch device, allowing for greater light transmission efficiency across the device.

Embodiments of the present invention provide an optical switch for transmitting a plurality of light beams from an input to an output. In accordance with the present invention, a common waveguide is provided that has optical properties that improve the performance of the optical switch. In one embodiment, the switch has a first light deflection element at an input with a first birefringence, a second light deflection element at the output, and a waveguide having a second birefringence and optically disposed between the first and second light deflection elements. In accordance with the present invention, a light beam deflected by the first light deflection element is birefracted into two beams having a first divergence, the two beams have a second divergence in the waveguide, and the second birefringence differently refracts each of the two beams such that the magnitude of the second divergence is less than the magnitude of the first divergence. Preferably, there is no divergence of the two light beams in the waveguide.

Another embodiment of the present invention provides an optical switch for transmitting a light beam from one of a first plurality of inputs to one of a second plurality of outputs. The switch has a first plurality of light deflection elements with a first birefringence, a second plurality of light deflection element at the output, and a waveguide having a second birefringence and optically disposed between the first plurality of light deflection elements and the second plurality of light deflection elements. In accordance with the present invention, a light beam deflected by one of the first plurality of light deflection elements is birefracted into two beams having a first divergence, and the second birefringence differently refracts each of the two beams such that the magnitude of the second divergence is less than the magnitude of the first divergence.

Yet another embodiment of the present invention provides an optical switch for transmitting a light beam from an input to an output. The switch has a first light deflection element at the input with a first refractive index, a second light deflection element at the output, and a waveguide having a second refractive index and optically disposed between the first light deflection element and the second light deflection element. In accordance with the present invention, the first refractive index is greater than the second refractive index, such that a light beam deflected by the first light deflection element is further deflected by a greater amount in the waveguide.

One embodiment of the present invention provides an optical switch adapted to transmit a pair of diverging and perpendicularly polarized light beams from an input to an output. The switch includes a first waveguide having a birefringence and optically disposed between the input and the output. In accordance with the present invention, at least a portion of the waveguide has a birefringence, and the divergence of the pair of beams is birefracted into the waveguide to reduce the divergence of the beams.

In yet another embodiment of the present invention an optical switch is adapted to transmit a pair of diverging light beams from an input having a first refractive index to an output. The switch includes a waveguide having a second refractive index and optically disposed between the input and the output, where at least a portion of the waveguide has a first birefringence, and where the divergence of the pair of beams is birefracted into the waveguide to reduce the divergence of the beams.

These features together with the various ancillary provisions and features which will become apparent to those skilled in the art from the following detailed description, are attained by the optical switching apparatus and method of the present invention, preferred embodiments thereof being shown with reference to the accompanying drawings, by way of example only, wherein:

BRIEF DESCRIPTION OF DRAWINGS

FIG. 1 is a schematic diagram showing an optical switching module of the present invention.

FIGS. 2 and 3 schematically illustrate the details of the structure of the optical switch module of the present invention.

FIG. 4 is an isometric view showing the input side of an optical switch module of the present invention.

FIGS. 5(A) and 5(B) are schematic diagrams showing deflection of light of a prism pair in accordance with the present invention.

FIGS. 6(A), 6(B), and 6(C) illustrate the deflection of light through a common waveguide of the present invention for common waveguides having refractive indices that are greater than, equal to and less than, respectively, the input side refractive index.

FIG. 7 is a graph showing the effect of the refractive index of the common waveguide on the divergence ratio across the common waveguide.

FIGS. 8(A) and 8(B) show the propagation of light through a birefringent input side deflecting portion and the common waveguide.

FIGS. 9(A) and 9(B) show the propagation of light through a birefringent input side deflecting portion and a common waveguide where the birefringence of the common waveguide matches that of the input side and is selected to produce parallel beam propagation in the common waveguide, respectively.

DETAILED DESCRIPTION

Referring now to the drawings in combination with the description hereinafter presented, there is illustrated and described an improved optical switching apparatus having a high density of I/O channels. The optical switching device of the present invention employs EO induced deflection of an incoming optical beam or optical signal to reroute the incoming light signal from an input port to an output port. EO induced light beam deflection in piezoelectric materials is known and is described, for example, in an article entitled "Low-Voltage Drive Electro-Optic Pb (Zr, Ti) $O_3$ Waveguide Devices Fabricated By Solid-Phase Epitaxy" to Nashimoto et al of the Corporate Research Laboratories of Fuji Xerox Co., Ltd., Japan. The invention also includes a common waveguide having optical properties chosen to provide one or more of the following features: optical beam deflection across the waveguide that is greater than that created by the piezoelectric material; and collimation of the two refracted beams in the waveguide that result from birefringence of the piezoelectric material.

While a silicon substrate is employed to exemplify the process, the silicon substrate may be replaced by any other suitable substrate, e.g., glass plate, printed circuit board, etc., which may be chosen according to the design requirements. The switching element or EO device in the present example is preferably made from $LiNbO_3$ (lithium niobate, hereinafter termed as "LN") with a transition metal (e.g., Ti) in-diffused waveguide and with top and bottom electrodes that are preferably generally prism-shaped. It is to be understood that LN may be replaced by any material with a strong electro-optical coefficient. Alternative switching element materials include $PbZr_xTi_yO_3$ (lead zirconate titanate), hereinafter termed as "PZT," and lanthanum modified $PbZr_xTi_yO_3$, hereinafter termed as "PLZT." The material of the switching element may be either a bulk or thin film material and the electrodes may be made in various shapes, such as prisms, gratings, various combinations and arrays of prisms and gratings, etc. Thus, it is contemplated that switching elements of the present invention are not limited to lead zirconate titanate or lithium niobate, but may employ any other suitable electro-optic material to be formed as a wafer.

The common waveguide of the present invention is made from a material selected to transmit a beam from an EO device. The waveguide may be formed integrally with the deflectors on a single substrate, or can be formed separately and assembled into an optical switch. As described subsequently, the optical materials of the common waveguide, preferably the refractive index and birefringence are selected to increase the deflection of the EO device, reduce the effects of EO device birefringence, or both.

The waveguides may be formed from a highly transparent, highly heat-resistant polymer such as a fluorinated polyimide, or from quartz or another glass. Similar materials may also be used for the cladding layers, or an organic and/or inorganic hybrid may be used. Suitable methods for forming films of polymer systems include spin coating, dip coating, spray coating, or vapor phase growth processes such as evaporation polymerization or CVD. For glass systems, sputtering, evaporation, CVD or the like may be employed, and when a sol-gel method is used, spin coating, dip coating or spray coating may be employed. A light waveguide may be also formed by depositions of a lower cladding layer, a core layer, and a top-cladding layer. The refractive index (RI) of the core layer is set to slightly higher than the RI of the cladding layers.

Optical switching devices and deflectors which may be used to implement the present invention are described in co-owned Japanese patent application number Tokugan 2001-040006, filed on Feb. 16, 2001, Japanese patent application number Tokugan 2001-56009, filed on Feb. 28, 2001, U.S. patent Ser. No. 10/131,919 filed on Apr. 24, 2002, and U.S. patent Ser. No. 10/077,342 filed on Feb. 15, 2002, the disclosures of which are incorporated by reference.

Referring now to FIG. 1 there is seen a schematic diagram showing an optical switch module, generally illustrated as 100. Optical switch module 100 has an input side 130, a common waveguide 104, and an output side 140. Input side 130 is adapted to accept a plurality of s light beams or optical inputs I, shown in FIG. 1 as $I_i$, where i=1, 2, . . . , s, and to selectively deflect the accepted inputs through common waveguide 104. Output side 140 is adapted to receive the selectively deflected inputs I and further deflect the light into one or more of a plurality of s light beams or optical outputs O, shown in FIG. 1 as $O_i$, where i=1, 2, . . . , s. Common waveguide 104 separates input side 130 and output side 140, provides a common waveguide for all optical signals that are transmitted between inputs $I_i$ and outputs $O_i$.

An example of the switched transmission of light beams (in general, B) across optical switch module 100 is also presented in FIG. 1 as the paths of two selected beams $B_1$ and $B_2$. Specifically, FIG. 1 shows a first beam $B_1$ as it is transmitted along an undeflected path from input $I_2$ to output $O_2$, and a second beam $B_2$ as it is transmitted along path from input $I_2$ to output $O_1$ that is deflected in both input side 130 and output side 140. The deflection of beam $B_2$ is controlled to direct the beam from an input to a desired output. It is thus seen that the deflection of light by input side deflection portion 103 and the transmission of light from input side deflection portion to output side deflection portion 105 has many implications on the size and performance of optical switch module 100.

The selection of the optical properties of common waveguide 104 can provide for transmission and deflection of the light across the common waveguide in ways that reduce the size of optical switch module 100 and efficiently transfer light across the module. The inventive aspects of common waveguide 104 are exemplified by the following discussion of specific embodiments of the input side 130 and output side 140, including specific structures, configurations and materials, that are not intended to limit the scope of the present invention including, for example, the number and orientation of the inputs I and outputs O, and the arrangement of components in the input and output sides.

According to the broad aspect of the present invention, the optical properties of an optical switch module with a common waveguide are selected to produce advantageous results, such as decreased size, improved efficiently, or reduced device complexity. The effect of the optical properties of a common waveguide on the deflection is illustrated for three different materials in FIGS. 6(A), 6(B) and (C). The refractive index referred to in the discussion of FIG. 6 is the refractive index of that portion of switch module through which light rays propagate. Since the material may be birefringent, the rays considered in FIG. 6 are the ordinary rays, though a similar analysis holds for extraordinary rays. FIG. 6 shows specific embodiments of switch module 100 as optical switch modules 300, 400, and 500, having common waveguides 304, 404, and 504, for propagating light through material structures having refractive indices of $n_3$, $n_4$, and $n_5$, respectively. Each embodiment of FIG. 6 has an input side 130 with that propagates light with a refractive index n. As noted previously, one or more of the components of switch module 100 may include materials having different optical properties, for example by having a "core" surrounded by a "cladding." Specifically, for devices that are large relative to the wavelength of light travelling therethrough, the relevant refractive index with regard to this discussion is the refractive index of the core. The refractive indices $n_3$, $n_4$, and $n_5$ are selected to illustrate the effect of optical properties on the path of beams transmitted through switch modules 300, 400, and 500 with values of $n_3$>n, $n_4$=n, and $n_5$<n.

An x-axis is shown in FIG. 6 as perpendicular to the optical interfaces between the input side and common waveguide. The angular deflection of rays in FIG. 6 is exaggerated for illustrative purposes, and generally may only be on the order of a few degrees. Each optical switch module 300, 400, and 500 has an input side 130 and an output side 140. Input side 130 refracts light and, in this example, imparts a deflection angle θ to light beam B as it exits the input side. In general, beam B is then refracted at the interface between input side 130 and common waveguide 300, 400, or 500, according to the refractive index of the common waveguide, where it is transmitted through the common waveguide at an angle φ. Specifically, optical switch modules 300, 400, and 500 are shown with transmitted light beams $B_3$, $B_4$, and $B_5$ propagating an angle $\phi_3$, $\phi_4$, and $\phi_5$ according to the refractive index of common waveguides 304, 404, and 504, respectively.

A beam B that is normal to the input side-common waveguide interface, for example an undefracted beam which travels along the x-axis of FIG. 6, is transmitted across the interface without a change in angle. Likewise, if there is no change in the refractive index through which the light is transmitted, there is no change in angle, as for beam $B_4$ in FIG. 6(B) having $\phi_4$=θ. For $n_3$>n, as in FIG. 6(A), the deflection angle in common waveguide 304 is reduced relative to the input side 130: $\phi_3$<θ. For $n_5$>n, as in FIG. 6(C), the deflection angle in common waveguide 304 is increased relative to the input side 130: $\phi_5$<θ.

As shown in FIG. 6(C), the refractive index of the common waveguide 104 can be selected to increase the deflection of light beams from the input side 130. This is further illustrated in FIG. 7, which presents a graph of the ratio of angle expansion, φ/θ, as a function of the refractive index of light propagation through the common waveguide for a specific refractive index of 2.5. When the input side refractive index is less than the waveguide refractive index, the angle of expansion is increased over that of the input side 130. The increased deflection caused by a lower refractive index can be used to reduce the length L of common waveguide 104, or to reduce the complexity of refractive members of input side 130, because the light beam can be diffracted to a desired output over a shorter distance.

In accordance with the present invention, selection of optical properties of optical switch device components is used to reduce the deleterious birefringent effects in optical switch modules. Specifically, materials exhibiting electro-optic effects useful for diverting light signals, such as the portion of waveguide 103 through which light passes often exhibit birefringence. Birefringence is the directional variation of optical properties that can occur in some anisotropic materials, and is manifested in the ability of the material to propagate monochromatic plane waves with differing polarities at different speeds. Light entering a birefringent material at an angle is thus refracted according to its polarity, and travels within or emerges from the material as two divergent beams having orthogonal polarities. These beams diverge within the waveguide, requiring more complicated light collimation at the output end or resulting in a reduced output signal. In accordance with the present invention, the effects of birefringence in the EO material are reduced by selecting the refractive index and birefringence of optical switch module components, and in particular to the properties in the common waveguide.

The birefringent splitting of a single input beam is illustrated in FIGS. 9(A) and 9(B), which shows the propagation of light through switch modules 900a and 900b having common waveguides 904a and 904b, respectively. Input side 130 and output side 140 include birefringent materials that accept an incident ray $R_i$, deflect it and transmit it into common waveguide 904 as an ordinary ray $R_o$ and an extraordinary ray $R_e$. As before, the divergence of the rays from the incident ray at the exit of and within input side 130 is indicated as θ, and the divergence of the rays from the incident ray within waveguide 900 is indicated as φ. Specifically, the angles of deflection of the ordinary ray and extraordinary ray at the exit of input side 130 of switch modules 900a and 900b are $\theta_o$ and $\theta_e$, respectively, relative to the direction of incident ray $R_i$. The angles $\theta_o$ and $\theta_e$ are generally on the order of a few degrees, and are shown exaggerated in FIG. 9 for illustrative purposes.

The light transmitting material of common waveguide 904a in FIG. 9(A) matches that of input side 130 and output side 140, resulting in a waveguide that transmits the ordinary and extraordinary rays without further refraction from input side 130 to output side 140. Specifically, the angle of propagation of the ordinary ray $R_o$ is deflected from angle $\theta_o$ in input side 130 to an angle $\phi_o = \theta_o$ in common waveguide 904a, and extraordinary ray $R_e$ is deflected from angle $\theta_e$ in input side 130 to an angle $\phi_e$ in common waveguide 904a. The divergence of the rays in common waveguide 904a is thus $\Delta\phi = \phi_e - \phi_o = \theta_o - \theta_e$. As the ordinary and extraordinary ray traverse the length L of common waveguide 904, they will continue to diverge, resulting in a lateral separation of the ordinary and extraordinary rays at the output of switch module 900a of $W_a$. $W_a$ is a function of the separation distance between the input and the output.

Divergence of the beams within common waveguide 904 can degrade the performance of optical switching device 100, as it can result in a loss of signal. Thus, for example, rays $R_o$ and $R_e$, which both contain the information of ray $R_i$, are separated by lateral separation $W_a$ as a direct result of the birefringence of switching module 900a.

As shown in FIG. 9(B), a lateral separation $W_b$ of rays $R_o$ and $R_e$ is minimized through the selection of a material for common waveguide 904b having a birefringence that minimizes the divergence of the rays in the waveguide. As in FIG. 9(A), incident ray $R_i$ is deflected and refracted into beams diverging in general according to: $\Delta\theta = \theta_e - \theta_o$. Each beam will then refract upon passing into common waveguide 104 resulting in a divergence of $\Delta\phi = \phi_e - \phi_o$. $\Delta\phi$ may be calculated using Snell's law using the refractive index for the ordinary ray and the extraordinary ray in the input side 130 ($n_o$ and $n_e$, respectively) and the common waveguide 104 ($N_o$ and $N_e$, respectively). However, by properly selecting the materials, refraction can be adjusted such that $\Delta\phi = 0$ for a given deflection, and the beams are parallel as they pass through common waveguide 104, thereby reducing the effect of birefringence to the displacement produced in the waveguide. Solving for the angles shown in FIG. 9 with $\phi_e = \phi_o = \phi$ and $\theta_e = \theta_o + \alpha$ gives:

$$n_o \sin(\theta_o) = N_o \sin(\phi); \text{ and} \tag{1}$$

$$n_e \sin(\theta_o \alpha) = N_e \sin(\phi). \tag{2}$$

The birefringence can be defined as $n_e = n_o + \chi$ and $N_e = N_o + X$ giving:

$$(n_o + \chi)\sin(\theta_o + \alpha) = (N_o + X)\sin(\phi). \tag{2'}$$

Dividing (2') by (1) and using the identity $\sin(\theta_o + \alpha) = \sin(\theta_o)\cos(\alpha) + \cos(\theta_o)\sin(\alpha)$ gives:

$$(1 + \chi/n_o)(\cos(\alpha) + \sin(\alpha)/\tan(\theta_o)) = (1 + X/N_o) \tag{3}$$

Equation (3) shows that for given optical properties $\chi$ and $n_o$ of input side 130, an amount of deflection $\theta_o$ of an ordinary ray from input side, and a given divergence angle α between the ordinary and extraordinary ray from the input side, the ratio of optical properties $X/N_o$ of common waveguide 104 can be calculated. This may be used to minimize the effects of birefringence.

An embodiment of the present invention is shown in FIG. 2 is shown as optical switch module 200, where input side 130 has an input side optical waveguide portion 101, an input side collimating portion 102, and an input side deflecting portion 103, and output side 140 includes an output side deflecting portion 105, a focusing portion 106, and an output side optical waveguide portion 107 an output side deflecting portion 105, a focusing portion 106, and an output side optical waveguide portion 107. Common waveguide 104 has a length L as measured in the direction separating input side 130 and output side 140, and a width W measured perpendicular to the direction of L and aligned with the plurality of inputs I and outputs O.

In optical switch module 200, the input side optical waveguide portion 101, the input side collimating portion 102, the input side deflecting portion 103, the common waveguide 104, the output side deflecting portion 105, the focusing portion 106, and the output side optical waveguide portion 107 can be integrally formed on a substrate 98. To the extent that the manner of fabricating the various "portions" are not described herein, the fabrication techniques are well known to those skilled in the art. Alternatively, one or more of the components may be separately formed and assembled to form an optical switch 100.

The input side optical waveguide 101 is constructed of a plurality of optically transparent layers for accepting a corresponding one of the plurality of inputs I. The layers may be formed by standard lithographic techniques. The waveguide 101 layers are sometimes referred to as "core"

101a, and clad layers 101b. Each comprises a three-layer stack with the core layer being sandwiched between the two cladding layers. This three-layer structure confines the optical beams from each of one of the plurality of inputs I within the corresponding respective core layers 101a due to the difference of refractive index between the core and the clad layer. The output side of waveguide 107 is similar to the structure of the input side of waveguide 101 and is constructed of a plurality of optical layers, so called cores, 107a, and clad layers 107b which form three-layer structures 107 in the same manner and corresponding to each of one of the plurality of outputs O.

As shown in FIG. 2, the number of the optical waveguides 101 at the input side of optical waveguide 101 is equal to the number of the optical waveguides 107a of the output side of optical waveguide 107. The number of the optical waveguides 101a and the number of the optical waveguides 107a is equal to "s" where "s" is an integer having a value of two or more. In other embodiments of the invention, the number of the optical waveguides on the input side of optical waveguide 101 may be different from the number of the optical waveguides on the output side of optical waveguide 107. In optical switch module 200, the cores 101a and 107a are laterally spaced in the direction of width W, preferably at an even spacing.

The collimating portion 102 is comprised of "s" number of micro-lenses or collimating lenses 102a. Each of the collimating lenses 102a is either integrally formed with, or is located at a position slightly apart from the end portion of respective optical waveguides 101a. The light outputs from optical waveguides 101 an initially broaden out in a divergent manner, but are then collimated by the collimating lenses 102a.

In the input side deflection portion 103, "s" light deflection elements 103a are provided. Each of the light deflection elements 103a is positioned at a location slightly apart in a light axis direction from respective collimating lens 102a. Each light deflection element deflects or changes the propagation direction of light signal by using either quadratic or linear electro-optic effects.

The common optical waveguide 104 is constructed as a slab-type waveguide to confine light in the waveguide as it is transmitted from input side 130 to output side 140. In the embodiment of FIG. 2, this is represented by the plane of width, W, and length, L. Common optical waveguide 104 transmits light that passes through the input side light deflection portion 103 to the output side light deflection portion 105. Thus, a plurality of optical signals pass through common optical waveguide 104 at the same time.

At the output side light deflection element portion 105, "s" number of light deflection elements 105a are provided. These light deflection elements 105a deflect the optical beam received by the light deflection element after passing through the common optical waveguide 104. Light deflection elements 105a, respectively, change direction of respective optical beams to a direction parallel to the optical axis direction of corresponding respective optical waveguides 107a. In a preferred embodiment of the direction, both light deflection elements 103a and 105a have generally the same structure.

The focusing portion 106 is comprised of "s" number of focusing lenses 106a. These focusing lenses 106a focus the light signals from the respective light deflection elements 105a to the output optical waveguides 107a. details of the collimating lens portion 102, the input side light deflection element portion 103, the output side light deflection element portion 105, and the focusing portion 106 in optical switch module 100 are explained with reference to FIGS. 3 and 4.

Each of the collimating lenses 102a as shown in FIGS. 3 and 4, is preferably a two-dimensional lens comprised of two portions 102c and 102d, with each portion having a different refractive index. The portions 102c, having a relatively higher refractive rate (a convex lens portion), are preferably formed by the same material used for forming the optical waveguide or core 101a. Portions 102d, having a relatively lower refractive index are preferably comprised of openings filled with air or other gas, or any suitable material (e.g., gels).

The focusing lenses 106a are similar in structure to the collimating lenses 102a. Each focusing lens includes a portion (a convex lens portion) 106c having a high refractive rate and a portion 106d having a low refractive rate. Preferably, the refractive direction of focusing lenses 106a is opposite to the refractive direction of collimating lenses 102a, and are preferably formed by the same material used for forming the optical waveguide or core 107a.

Light deflection elements 103a, constructed as part of the input side light deflection portion 103, comprise one or more prism pairs 103p. In an alternative embodiment one or more individual prisms, rather than prism pairs, may be used. One prism pair 103p, as shown in FIG. 4, includes a slab-type waveguide 103b made from a material having electro-optic properties, and includes a first prism 103p1 and a second prism 103p2. As is well known in the art, an electro-optic material can be made to change its optical properties by the application of a suitable electric potential. As shown in FIG. 4, first and second upper electrodes 103c and 103d are formed on the upper side of slab-type waveguide 103b, and first and second lower electrodes 103e and 103f are formed on the lower side of slab-type waveguide 103b. The first and second upper electrodes 103c and 103d and the first and second lower electrodes 103e and 103f may each be formed substantially in a shape of a triangle (e.g., a wedge shape), respectively.

The first upper electrode 103c and the first lower electrode 103e are generally opposed and slab-type waveguide 103b is positioned therebetween. The first upper electrode 103d and the second upper electrode 103f are spaced apart and face each other along an oblique side associated with each of the upper electrodes. The second upper electrode 103d and the second lower electrode 103f are also generally opposed with slab-type waveguide 103b positioned there between. The first prism 103p1 is thus formed from that portion of waveguide 103b bounded by first upper electrode 103c and first lower electrode 103e, and second prism 103p2 is formed from that portion of waveguide 103b bounded by second upper electrode 103d and second lower electrode 103f. Thus the slab-type waveguide 103b is common for each prism pair 103p. By using such a structure for each prism pair 103p, the size of each prism pair may be reduced.

After passing through collimating lenses 102a and prism pair 103p, the light then is directed into common waveguide 104 and towards light deflection elements 105a. Specifically, common waveguide 104 includes a core 104a surrounded by cladding 104b, and the light is directed into core 104a, as shown in FIG. 4. Continuing to refer to FIG. 3, the light deflection elements 105a of the output side light deflection portion 105 are similar to the input side light deflection elements 103a, and include the slab-type waveguide 105b made from a material having electro-optic properties, and one or more prism pairs 105p. Each of the prism pairs 105p is generally the same as each of the prism pairs 103p, and more specifically includes first and second electrode pairs (not shown), which correspond to and are essentially the same as first and second upper and lower electrodes 103c, 103d, 103e and 103f, respectively. In a preferred embodiment, the first and second upper electrodes and the first and second lower electrodes for the prism pair 105p are generally triangular. A controllable source of electrical potential (not shown) is coupled to the electrodes to activate the electro-optic material. Suitable controllable sources for applying electrical potentials to the electrodes are well known to those skilled in the art and need not be described in further detail.

FIGS. 5(A) and (B) are schematic diagrams for illustrating deflection of light by prism pair 103p within waveguide 103b. In FIG. 5, arrow A indicates a direction of transmission of light through waveguide 103b and arrow E indicates a direction of electronic field applied to the prism pair 103p. Also shown in FIG. 5 are a set of reference axes (x,y,z). The x and y axes define a plane that corresponds with the light transmission directions of waveguide 103b, and the z-axis is aligned with the thickness of the waveguide.

As shown in FIG. 5(A), the first lower electrode 103e is connected to the ground line (G). In this state, when a control voltage (+V) is applied to the first upper electrode 103c, the refractive index of waveguide 103b at prism 103p1 between the first upper electrode 103c and the first lower electrode 103d changes from n to n+$\Delta$n according to the strength of field E and the electro-optic properties of waveguide 103b. The application of a control voltage to the first upper electrode 103c thus changes the refractive index of prism 103b1, deflecting the light transmitted through the prism. Thus the transmission direction A of light signal is deflected from the x-axis in the x-y plane to the right at an angle $\theta$, according to the strength of field E. On the other hand, when the second upper electrode 103d is connected to the ground line (G) as shown in FIG. 5(B), and a control voltage (+V) is applied to the second lower electrode 103f, the refractive index of the slab-type waveguide 103b within second prism 103p2, which is bound by upper electrode 103d and lower electrode 103f, changes from n to n−$\Delta$n. Thus the transmission direction A of light signal is further deflected from the x-axis in the x-y plane to the right at an angle $\theta$. Hereinafter, these electrodes to which the control voltage is applied may also be called control electrodes, which correspond to the first upper electrode 103c and the second lower electrode 103f.

Therefore, a light signal can be deflected within the possible transmission directions of a waveguide by an angle 2$\theta$ with one prism pair. Thus, when "m" number of prism pairs 103p are located in tandem in a channel, with "m" being an integer having a value of two or more, the deflection direction from the transmission direction of the light signal can be 2$\theta$×m. Since the light propagating in the deflector is confined in the optical core layer, it is the core layer, which should have electro-optical properties. Cladding layers do not need to be from an EO material. Therefore, the top and bottom electrodes can be placed either directly on the core layer or on the cladding layers. Placing electrode directly on the core layer can result in optical losses due to metal absorption; however, placement directly on the core layer reduces the applied voltage necessary to create a required electric field. The specific configuration selected will depend on the structure of the deflector array, e.g., bulk material or thin films, as well as the system design requirements.

In a preferred embodiment of the optical switching device of the present invention, there is a controller for turning on and off the voltage applied to each of the control electrodes of the light deflection elements in each of light switching modules 103a. The controller, which may be a microprocessor (not shown in the drawings), is coupled to each of the electrodes of the light deflection elements through conductive paths that enable the application of suitably control voltages.

As noted previously, the selection of the configuration and materials of common waveguide 104 affects the size and performance of optical switch module 100. The operation of common waveguide 104 will now be considered with reference to several embodiments of optical switch module 100.

Referring now to FIGS. 6(A), 6(B) and (C), switch modules 300, 400, and 500 have common waveguides 304, 404, and 504 with cores 304a, 404a, and 504a having refractive indices $n_3$, $n_4$, and $n_5$, respectively. Light is propagated within input side 130 through waveguide 103b having a refractive index n. As noted previously, these refractive indices can refer to the index of either the ordinary or extraordinary ray. FIG. 7 shows the ratio of angle expansion, $\phi/\theta$ for a specific refractive index of waveguide 103b of 2.5, and as a function of the refractive index of the core 104a of the common waveguide. When the refractive index of waveguide 103b is less than the refractive index of core 104a, the angle of expansion is increased over that of the input side 130. The increased deflection caused by a lower refractive index can be used to reduce the length L of common waveguide 104, or to reduce the number or size of prism pairs 103p or the deflection through an individual prism.

The selection of optical properties to modify the deflection of birefringent light through a common waveguide, considered for the general case in FIG. 9, will now be presented for the illustrative case of embodiments of FIGS. 2–5. The birefringent splitting of a single input beam is illustrated in FIGS. 8(A) and 8(B), which shows an incident ray $R_i$ and the two polarized deflected rays, specifically the ordinary ray $R_o$ and the extraordinary ray $R_e$. The several interfaces through which the ray passes are shown as a first prism face 801 and a second prism face 802 as part of prism 103p1, a third prism face 803 and a forth prism face 802 as part of prism 103p2, and the interface 805 between input side deflecting portion 103 and common waveguide 104.

Ray $R_i$, traveling in crystal axis of waveguide 103b initially contains non-polarized light. Ray $R_i$ passes into prism 103p1 perpendicular to first prism face 801 along the optical axis of waveguide 103b, and thus is not deflected. Ray $R_i$ is deflected as it passes out of prism 103p1 at second prism face 802, and through prism 103p2 across third prism face 803 and forth prism face 804. Since waveguide 103b is birefringent, the amount of ray deflection at each surface depends on the polarization of the light, resulting in ordinary ray $R_o$ and extraordinary ray $R_e$, each having different polarities. As the rays pass from input side light deflection portion 103 into common waveguide 104 at interface 805, the ordinary ray $R_o$ and the extraordinary ray $R_e$ are again refracted according to the birefringence of core 104a.

As shown in FIG. 8(B), the angles of deflection of the ordinary ray and extraordinary ray in at the waveguide 103b side of interface 805 are $\theta_o$ and $\theta_e$, respectively. The ordinary ray $R_o$ is deflected from angle $\theta_o$ in portion 103 to an angle $\phi_o$ in portion 104, and extraordinary ray $R_e$ is deflected from angle $\theta_e$ in portion 103 to an angle $\phi_e$ in portion 104. The divergence of the rays as they enter common waveguide 104 is thus $\Delta\phi=\phi_e-\phi_o$. As the ordinary and extraordinary ray traverse the length L of common waveguide 104, the ordinary and extraordinary rays will continue to propagate with a divergence of $\Delta\phi$.

As noted previously, the angles $\theta_e$, $\theta_o$, $\phi_e$, and $\phi_o$ depend on the properties and geometries of the materials through which the rays pass. For the embodiments of FIGS. 2–5, Equation (3) provides the ratio of optical properties $X/N_o$ of waveguides 103b and 104 to obtain parallel ordinary and extraordinary beam propagation in common waveguide 104 for a given deflection angle. This equation may be used to select or design a material having the proper ratio of optical properties, or may be combined with a value of $N_o$ using a calculation such as that used to generate FIG. 7 to optimize the deflection φ in common waveguide 104, and thus used to set both X and $N_o$ for the common waveguide.

The waveguides or cores may be manufactured of materials having optical properties that provide an increase of the deflection of beams, correction of core birefringence, or both. Thus is preferred that the refractive index of the common waveguide 104 be greater than that of the input side deflection portion 103. It is also preferred that common waveguide 104 material have a birefringence that provides for approximately parallel beam propagation of light that is birefringently refracted in input side deflection portion 103.

A typical birefringent material for input side deflection portion 103, or at least of waveguide 103b is PLZT. PLZT has refractive indices of n(TE)=2.5152 and n(TM)=2.4984 depending on the polarization of the transmitted light, where n(TE) is the refractive index in the crystal direction transverse to the electric field of the light, and n(TM) is the refractive index in the crystal direction transverse to the magnetic field of the light. PLZT also has electro-optic coefficient of 50 pm/V for TE and 55 pm/V for TM for typical e-fields of 1V/um.

A typical birefringent material for the light propagating portion of common waveguide 104 is polymer such as polystyrene, which as n(TE)=1.59 and n(TM)=1.60. Polystyrene has an output beam angle in the TM mode that is 10% larger than that of TE mode The use of a polystyrene common waveguide 104 with a PLZT waveguide 103b can reduce the divergence angle of the two beam modes in the common waveguide by 40%.

The invention as described may be incorporate into a wide variety of types of optical switch modules using EO deflection schemes or using common waveguides, examples of which may be found in co-pending and co-owned U.S. patent Ser. No. 10/131,919 and U.S. patent Ser. No. 10/077, 342. These switches include, but are not limited to 2×2 channel optical switch modules, switches for multiplexed signals, such as multiple input of WDM signals, and switches including divergence correction.

It is to be understood that this invention is not limited to those embodiments and modifications described in the specification. Modifications and variations can be made one skilled in the art without departing from the sprit and scope of the invention. Moreover, any one or more features of any embodiment of the invention may be combined with any one or more other features of any other embodiment of the invention, without departing from the scope of the invention.

What is claimed is:

1. An optical switch for transmitting a light beam from an input to an output comprising:

a first light deflection element at said input having at least a portion with a first birefringence;

a second light deflection element at said output; and a waveguide having a second birefringence optically disposed between said first light deflection element and said second light deflection element, where a light beam deflected by said first light deflection element is birefracted into two beams having a first divergence, where the two beams have a second divergence in the waveguide, and where the second birefringence differently refracts each of the two beams such that the magnitude of the second divergence is less than the magnitude of the first divergence.

2. The optical switch of claim 1, wherein said first light deflection element has a first refractive index, wherein said waveguide has a second refractive index, and wherein said first refractive index is greater than said second refractive index, such that a light beam deflected by said first light deflection element is further deflected by a greater amount in said waveguide.

3. The optical switch of claim 1, wherein said first light deflection element includes an electro-optic material.

4. The optical switch of claim 1, wherein said second light deflection element includes an electro-optic material.

5. The optical switch of claim 1, wherein each of said two divergent beams is substantially parallel in said waveguide.

6. The optical switch of claim 1, wherein said input has a first plurality of inputs, wherein said output has a second plurality of outputs, wherein each of said first plurality of inputs has a corresponding first light deflection element, wherein each of said second plurality of outputs has a corresponding second light deflection element.

7. The optical switch of claim 6, wherein at least one of said two divergent beams is substantially parallel in said waveguide.

8. An optical switch for transmitting a light beam from one of a first plurality of inputs to one of a second plurality of outputs comprising:

a first plurality of light deflection elements at said first plurality of inputs each including a material with a first birefringence;

a second plurality of light deflection elements at said second plurality of outputs; and a waveguide optically disposed between said first plurality of light deflection elements and said second plurality of light deflection elements having a second birefringence, where a light beam deflected by one of said first plurality of light deflection elements is birefracted into two beams having a first divergence, and where the second birefringence differently refracts each of the two beams such that the magnitude of the second divergence is less than the magnitude of the first diversence.

9. The optical switch of claim 8, wherein said first plurality of light deflection elements includes an electro-optic material.

10. The optical switch of claim 8, wherein said second plurality of light deflection elements includes an electro-optic material.

11. The optical switch of claim 8, wherein said first plurality of light deflection elements and said second plurality of light deflection elements each has a first refractive index, wherein said waveguide has a second refractive index, and wherein said first refractive index is greater than said second refractive index such that a light beam deflected by said first light deflection element is further deflected by a greater amount in said waveguide.

12. An optical switch for transmitting a light beam from an input to an output comprising:
   a first light deflection element at said input having a first refractive index;
   a second light deflection element at said output; and
   a waveguide having a second refractive index and optically disposed between said first light deflection element and said second light deflection element,
   where said first refractive index is greater than the second refractive index,
   such that a light beam deflected by said first light deflection element is further deflected by a greater amount in said waveguide; and
   wherein said first light deflection element has a first birefringence, where a light beam deflected by said first light deflection element is birefracted into two beams with a first divergence, and
   where at least a portion of said waveguide has a second birefringence and where the second birefringence differently refracts each of the two beams with a second divergence such that the magnitude of the second divergence is less than the magnitude of the first divergence.

13. The optical switch of claim 12, wherein said first light deflection element includes an electro-optic material.

14. The optical switch of claim 12, wherein said second light deflection element includes an electro-optic material.

15. The optical switch of claim 12,
   wherein said at least portion of said waveguide includes a substantial portion of the light beam path from said first light deflection element to said second light deflection element, and
   wherein each of said two second divergent beams is substantially parallel in said waveguide.

16. An optical switch adapted to transmit a pair of diverging and perpendicularly polarized light beams from an input to and output comprising:
   a first waveguide optically disposed between said input and said output, where at least a portion of said waveguide has a birefringence, and where the divergence of the pair of beams is birefracted into the waveguide having a first divergence, where the two beams have a second divergence in the waveguide, and
   where the second birefringence differently refracts each of the two beams such that the magnitude of the second divergence is less than the magnitude of the first divergence.

17. The optical switch of claim 16, wherein said at least a portion of said waveguide includes a substantial portion of the light beam path from said input to said output, and wherein said pair of diverging light beams from said input are substantially parallel in said waveguide.

18. The optical switch of claim 16 further comprising:
   a first plurality of light deflection elements at said input, where said first plurality of light deflection elements includes a second birefringent material; and
   a second plurality of light deflection elements at said output.

19. An optical switch adapted to transmit a pair of diverging light beams from an input having a first refractive index to an output comprising:
   a waveguide having a second refractive index and optically disposed between said input and said output, where at least a portion of said waveguide has a first birefringence, and where the divergence of the pair of beams is birefracted into the waveguide having a first divergence, where the two beams have a second divergence in the waveguide, and
   where the second birefringence differently refracts each of the two beams such that the magnitude of the second divergence is less than the magnitude of the first divergence.

* * * * *